(12) United States Patent
Holub et al.

(10) Patent No.: US 11,584,318 B2
(45) Date of Patent: Feb. 21, 2023

(54) AUTOMATIC POWERTRAIN OPERATION FOR MAINTENANCE OF NEUTRAL OPERATION

(71) Applicant: Ford Global Technologies, LLC, Dearborn, MI (US)

(72) Inventors: Patrick Holub, Novi, MI (US); John Van Wiemeersch, Novi, MI (US); Todd Ansbacher, Westland, MI (US); Ronald Fitzgerald, Ann Arbor, MI (US); Adam Stratton, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 253 days.

(21) Appl. No.: 17/085,613

(22) Filed: Oct. 30, 2020

(65) Prior Publication Data
US 2022/0134979 A1    May 5, 2022

(51) Int. Cl.
| | | |
|---|---|---|
| *B60R 16/033* | (2006.01) | |
| *B60R 16/03* | (2006.01) | |
| *F16H 57/04* | (2010.01) | |
| *B60W 10/06* | (2006.01) | |
| *B60L 1/00* | (2006.01) | |
| *B60W 30/18* | (2012.01) | |
| *B60W 10/10* | (2012.01) | |

(52) U.S. Cl.
CPC .............. *B60R 16/033* (2013.01); *B60L 1/00* (2013.01); *B60R 16/03* (2013.01); *B60W 10/06* (2013.01); *B60W 10/10* (2013.01); *B60W 30/18072* (2013.01); *F16H 57/04* (2013.01); *F16H 57/0412* (2013.01); *B60L 2240/54* (2013.01); *B60W 2510/101* (2013.01); *B60W 2510/107* (2013.01); *B60W 2520/10* (2013.01); *B60W 2520/28* (2013.01); *B60W 2710/06* (2013.01); *B60W 2710/10* (2013.01)

(58) Field of Classification Search
CPC ........ B60L 1/00; B60L 2240/54; B60R 16/03; B60R 16/033; B60W 10/06; B60W 10/10; B60W 30/18072; B60W 2510/101; B60W 2510/107; B60W 2520/10; B60W 2520/28; B60W 2710/06; B60W 2710/10; F16H 57/04; F16H 57/0412
See application file for complete search history.

(56) References Cited

U.S. PATENT DOCUMENTS

| | | |
|---|---|---|
| 5,522,776 A | 6/1996 | Alvey |
| 6,345,224 B1 | 2/2002 | Schumacher et al. |
| 8,688,339 B2 | 4/2014 | Fyie et al. |
| 8,907,620 B2 | 12/2014 | Van Wiemeersch |

(Continued)

*Primary Examiner* — Edwin A Young
(74) *Attorney, Agent, or Firm* — Frank Lollo; Eversheds Sutherland (US) LLP

(57) ABSTRACT

A method for managing electrical Key Off Load (KOL) and other potentially damaging operational conditions in a vehicle while in a neutral mode setting, comprising: determining a vehicle drivetrain is in the neutral mode setting; determining an operational characteristic that changes with time while the vehicle is in the neutral mode setting; performing, via a vehicle control module and based on the neutral mode setting and the operational characteristic, vehicle actions comprising engaging an automated start powertrain activation while the vehicle is in the neutral mode setting.

20 Claims, 6 Drawing Sheets

(56) References Cited

U.S. PATENT DOCUMENTS

| | | | |
|---|---|---|---|
| 9,193,232 B2 | 11/2015 | Huntzicker | |
| 9,328,819 B2 | 5/2016 | Deurloo et al. | |
| 9,707,928 B2 | 7/2017 | Skelton | |
| 9,784,229 B2 | 10/2017 | Holub et al. | |
| 10,167,836 B2 | 1/2019 | Holub et al. | |
| 2004/0152558 A1* | 8/2004 | Takami | B60W 30/18027 477/3 |
| 2014/0137702 A1 | 5/2014 | Tsukashima et al. | |
| 2014/0297088 A1* | 10/2014 | Ando | B60W 10/08 180/65.265 |
| 2015/0291165 A1* | 10/2015 | Mitsuyasu | B60W 10/06 701/54 |

\* cited by examiner

AUTOMATIC POWERTRAIN OPERATION FOR MAINTENANCE OF NEUTRAL OPERATION

BACKGROUND

While the need for vehicle operation in neutral gear has remained unchanged from decades past, technological advancements have made it increasingly complicated to initiate and difficult or impossible to sustain neutral operation of vehicles for prolonged periods of time, such as for recreational towing and unattended parking in neutral gear. The result has been a steady decline in the number of alternatives for vehicles capable of sustained neutral operation and an increasing number of warranty claims for vehicle damage resulting from vehicles being towed improperly.

U.S. Pat. No. 9,193,232 (hereafter "the '232 patent"), assigned to GM Global Technology Operations, LLC, discloses a telematics system for a vehicle to be towed. The telematics module disclosed in the '232 patent may not be activated until the transmission gear selector indicates that the vehicle has been placed in neutral mode. The telematics module receives information from the vehicle and sends the information to a remote access system indicating that the vehicle is being towed. While conventional systems may protect transmission gear selection during towing, they may not protect the vehicle components from electrical unanticipated Key-Off Load (KOL) when in a neutral state during other vehicle operations. Conventional systems may protect transmission components from insufficient lubrication and cooling of spinning powertrain components when the vehicle is being towed. However, conventional electric drive train vehicles with permanent magnet traction motors connected directly to drive wheels may be susceptible to component damage when the traction motor generates high voltage to its controller circuit boards when the vehicle is towed at higher speeds.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
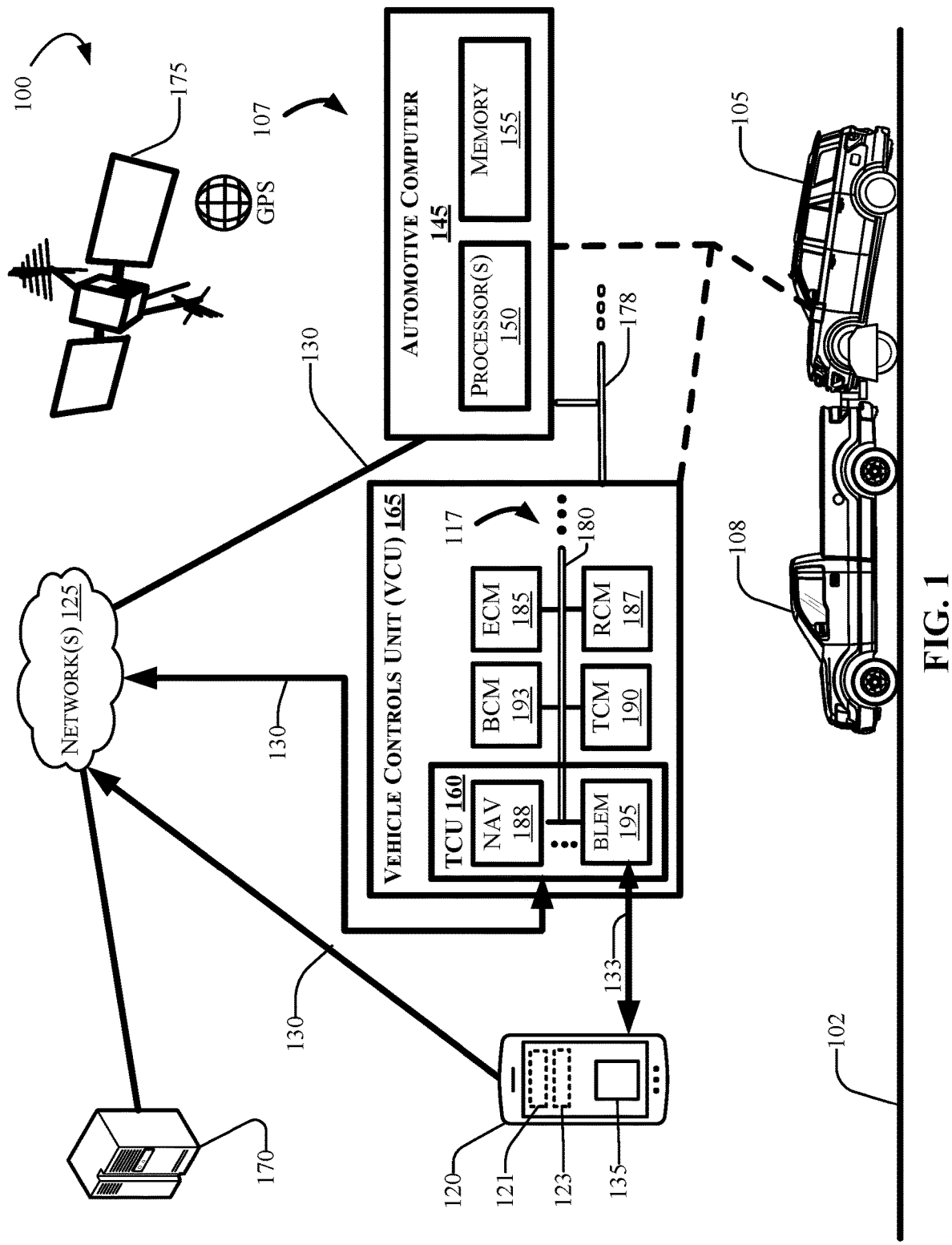
FIG. 1 depicts an example computing environment in which techniques and structures for providing the systems and methods disclosed herein may be implemented.

The disclosure is directed to a sustained neutral management system for enabling an extended neutral state in a vehicle drivetrain (e.g., for vehicle towing scenarios, or in situations where the vehicle is parked in neutral). Previously, putting a vehicle in neutral simply involved mechanically shifting the vehicle into neutral, but modern vehicles include sophisticated electrical systems that prevent the driver from putting the vehicle in neutral and exiting the vehicle. Disclosed systems can remedy this current limitation via controlling a vehicle powertrain to a Key-on state to maintain the vehicle in neutral for an extended period of time.

In one embodiment, the controller automatically engages the vehicle motor or tractive energy reserves to maintain the service battery State-of-Charge (SOC), transmission lubrication, and transmission cooling by monitoring various operating parameters in the vehicle, employing automatic engine automated starts and stops (for internal combustion engine powertrains) and automatic use of the traction batteries for electric vehicle powertrains.

In another embodiment, the controller may enable I/O functionality during the neutral state and monitor transmission output speed, wheel speed, a state of charge for the service and traction batteries, Transmission Oil Temperature (TOT), outside air temperature, and other operational characteristics. The controller monitors the operational characteristics and evaluates sensor information to evaluate and maximize allowable tow speeds, differences in wheel speeds between axles to ensure AWD (All Wheel Drive) vehicles are not being towed with only two wheels down, and determine whether vehicle batteries are near depletion and can no longer sustain vehicle operational control. The controller may also evaluate TOT or a TOT rate of change to determine if transmission damage is imminent.

In an embodiment where the vehicle is configured with an electric powertrain, the control system may mitigate damaging voltage to vehicle controller circuit boards above a threshold tow speed when the traction battery is disconnected from the motor, to allow the tractive battery connection to remain continuously on, but in a key-off, remote-started neutral state without incurring environmental costs or increased security risks.

The disclosed system and methods may also solve problems associated with conventional neutral maintenance systems, such as the inconvenience of special neutral modes of operation that must be manually invoked and the inevitable customer error and misuse in these modes.

These and other advantages of the present disclosure are provided in greater detail herein.

ILLUSTRATIVE EMBODIMENTS

The disclosure will be described more fully hereinafter with reference to the accompanying drawings, in which exemplary embodiments of the disclosure are shown, and not intended to be limiting.

Normally, vehicle movement is controlled by drivers seated in the vehicles. Inhibiting vehicle movement via a parked or locked driveline is the usual state following driver exit of the vehicle. However, unoccupied vehicle movement in a neutral (un-parked) driveline state is necessary for a few special purposes such as conveyor driven carwashes, towing with drive wheels on the ground or for loading onto a flat-bed tow truck, and in some countries for manual movement of unattended parked vehicles.

Prior to the proliferation of electronic controls throughout vehicles, engaging this neutral state of operation was done routinely without issue by simply moving a mechanical shift lever to the neutral transmission range position and exiting the vehicle. Eventually a key-in-ignition interlock was added to prevent ignition key removal (then exiting the vehicle) if the shifter was not in Park, and a Brake Transmission Shift Interlock (BTSI) was also added to prevent shifting from park after key removal. Together these two devices prevented the vast majority of unattended vehicle out-of-park circumstances—namely the driver forgetting to shift to park before exiting and the devices prevented someone other than the driver from inadvertently shifting the vehicle from park after driver exit.

The key-in ignition interlock and BTSI require significant power requirements associated with Key-Off Load (KOL) in vehicles to remain functional for the stated purposes when the customer leaves the vehicle in neutral mode. For short duration use cases, like a car wash or vehicle breakdown recovery, this is no issue. However, longer duration situations, such as parking or recreational towing, may fail to withstand the prolonged battery drain and result in a no-start or completely dead battery. Regulations requiring continuous display of transmission range position whenever the transmission shifter is not in Park, together with the increasing use of electronic Park-Reverse-Neutral-Drive-Low (ePRNDL), can require additional electrical power to provide the electronic display, and have increased the KOL to the point where parking in neutral and recreational towing currently require additional actions to prevent battery depletion.

For servicing vehicles in circumstances where electrical or BTSI functional breakdown prevent shifter movement from Park mode, a back-up BTSI release mechanism is a common addition to the shifter for towing and service personnel. In regions where manual movement of parked cars is required, this override mechanism became an often-utilized solution for leaving vehicles in a neutral state without physical ignition keys being trapped in the ignition or incurring various electrical power drains in the vehicle. However, use of the BTSI override does not prevent steering column locks from locking, which means it would not be usable for flat towing where steering must move freely.

For recreational towing, battery disconnection while towing is one of the most common and straightforward ways to protect batteries from excessive drain, but it is inconvenient and often requires periodic connection/disconnection to support periodic engine restarts to circulate transmission fluid through the transmission after extended driving lubrication and cooling.

The transmissions of some vehicles may not be able to accommodate significant amounts of time at highway towing speeds due to transmission lubrication and cooling issues and thus cannot be recreationally towed with the engine off. Of these, those that are 4×4s and have two-speed transfer cases offer another method to unlock the driveline for towing—by opening the driveline in the transfer case that connects the transmission output to the wheels or using another special mode and instructions to actuate. This can allow vehicle movement without turning the transmission components and thereafter incurring the associated issues with lubrication and cooling.

Today's vehicles include systems that are more complex and add further complications. Passive Ignition Keys cannot be trapped in ignition cylinders, but still do not allow related vehicle systems to power down unless the shifter is in Park or a special tow mode is used. The Shift-by-Wire (SBW) method adds computer arbitration between driver commands and shifter responses and prevents any key-off Non-park State except when using a tow mode. Without such a mode, automatic shift-to-park SBW functionality upon vehicle door opening will automatically return the vehicle to Park when the driver exits the vehicle, to prevent vehicle rollaway.

One recent technology is Park-by-Wire, which mechanically spring-locks into Park unless there is electrical power to hold open the solenoid that prevents this movement to Parl. Even if these transmissions are otherwise capable of being towed from a lubrication and cooling standpoint, they cannot be towed or moved without a mechanical pawl release mechanism or continuous electrical power applied to the solenoid. If power is lost while towing a Park-by-Wire vehicle, the vehicle transmission may be compromised.

Today's plug-in electrified vehicles with permanent magnet traction motors connected directly to drive wheels have a different problem with being towed than the cooling and lubrication issues of internal combustion engine (ICE) based transmissions. With traction battery power normally being disconnected from the power buss of the traction motor, the traction motor can generate voltage that exceeds limitations for the controller circuit boards when the towing speed exceeds certain thresholds.

Embodiments of the present disclosure describe a sustained neutral management system that can manage electric KOL when the vehicle is in a neutral state. If the battery becomes discharged during prolonged parking or vehicle towing, transmission lockup may be avoided, and the prolonged neutral state may be maintained. The sustained neutral management system may also solve the problems associated with insufficient lubrication and cooling when vehicles are towed, which may protect transmission components and minimize inconvenience associated with periodic manual startups. The sustained neutral management system described herein may also eliminate damage caused by towing an electric vehicle in neutral mode by connecting the vehicle battery to the wheels generating power as the vehicle is being towed. Embodiments of the present disclosure describe systems and methods that either allows the towing vehicle to issue a remote start command that can run indefinitely based on the vehicle environmental factors, such as whether the vehicle is outdoors, and based on vehicle characteristics such as vehicle fuel level, temperature, and other characteristics such as vehicle speed, GPS, steering, forward and rear camera images, and other indicators that differentiate real driving from a dyno for example.

As used herein an automated start is any activation of the vehicle performed by any means other than a driver who is present in the vehicle. An activation can be, for example, the generation of an automated start command by a computer, or an automated start powertrain activation in response to such a command. The automated start can be, for example, the owner of the vehicle using a remote start device such as a mobile phone, a tow truck driver, or the vehicle itself acting autonomously.

Considering embodiments in greater detail, FIG. 1 depicts an example computing environment 100 that can include a vehicle 105 comprising an automotive computer 145, and a Vehicle Controls Unit (VCU) 165 that typically includes a plurality of electronic control units (ECUs) 117 disposed in communication with the automotive computer 145. In some embodiments, the vehicle 105 may be in tow by a towing vehicle 108. A mobile device 120, which may be associated with a user 140 and the vehicle 105, may connect with the automotive computer 145 using wired and/or wireless communication protocols and transceivers. The mobile device 120 may be communicatively coupled with the vehicle 105 via one or more network(s) 125, which may communicate via one or more wireless channel(s) 130, and/or may connect with the vehicle 105 directly using near field communication (NFC) protocols, Bluetooth® protocols, Wi-Fi, Ultra-Wide Band (UWB), and other possible data connection and sharing techniques. The vehicle 105 may also receive and/or be in communication with a Global Positioning System (GPS) 175.

The automotive computer 145 may be or include an electronic vehicle controller, having one or more processor(s) 150 and memory 155. The automotive computer 145 may, in some example embodiments, be disposed in communication with the mobile device 120, and one or more server(s) 170. The server(s) 170 may be part of a cloud-based computing infrastructure, and may be associated with and/or include a Telematics Service Delivery Network (SDN) that provides digital data services to the vehicle 105 and other vehicles (not shown in FIG. 1) that may be part of a vehicle fleet.

Although illustrated as a sport utility, the vehicle 105 may take the form of another passenger or commercial automobile such as, for example, a car, a truck, a crossover vehicle, a van, a minivan, a taxi, a bus, etc., and may be configured to include various types of automotive drive systems. Exemplary drive systems can include various types of internal combustion engine (ICE) powertrains having a gasoline, diesel, or natural gas-powered combustion engine with conventional drive components such as, a transmission, a drive shaft, a differential, etc. In another configuration, the vehicle 105 may configured as an electric vehicle (EV). More particularly, the vehicle 105 may include a battery EV (BEV) drive system, or be configured as a hybrid EV (HEV) having an independent onboard powerplant, a plug-in HEV (PHEV) that includes a HEV powertrain connectable to an external power source, and/or includes a parallel or series hybrid powertrain having a combustion engine powerplant and one or more EV drive systems. HEVs may further include battery and/or supercapacitor banks for power storage, flywheel power storage systems, or other power generation and storage infrastructure. The vehicle 105 may be further configured as a fuel cell vehicle (FCV) that converts liquid or solid fuel to usable power using a fuel cell, (e.g., a hydrogen fuel cell vehicle (HFCV) powertrain, etc.) and/or any combination of these drive systems and components.

Further, the vehicle 105 may be a manually driven vehicle, and/or be configured to operate in a fully autonomous (e.g., driverless) mode (e.g., level-5 autonomy) or in one or more partial autonomy modes. Examples of partial autonomy modes are widely understood in the art as autonomy Levels 1 through 5. An autonomous vehicle (AV) having Level-1 autonomy may generally include a single automated driver assistance feature, such as steering or acceleration assistance. Adaptive cruise control is one such example of a Level-1 autonomous system that includes aspects of both acceleration and steering. Level-2 autonomy in vehicles may provide partial automation of steering and acceleration functionality, where the automated system(s) are supervised by a human driver that performs non-automated operations such as braking and other controls. Level-3 autonomy in a vehicle can generally provide conditional automation and control of driving features. For example, Level-3 vehicle autonomy typically includes "environmental detection" capabilities, where the vehicle can make informed decisions independently from a present driver, such as accelerating past a slow-moving vehicle, while the present driver remains ready to retake control of the vehicle if the system is unable to execute the task. Level 4 autonomy includes vehicles having high levels of autonomy that can operate independently from a human driver, but still include human controls for override operation. Level-4 automation may also enable a self-driving mode to intervene responsive to a predefined conditional trigger, such as a road hazard or a system failure. Level-5 autonomy is associated with autonomous vehicle systems that require no human input for operation, and generally do not include human operational driving controls.

Figure 2:
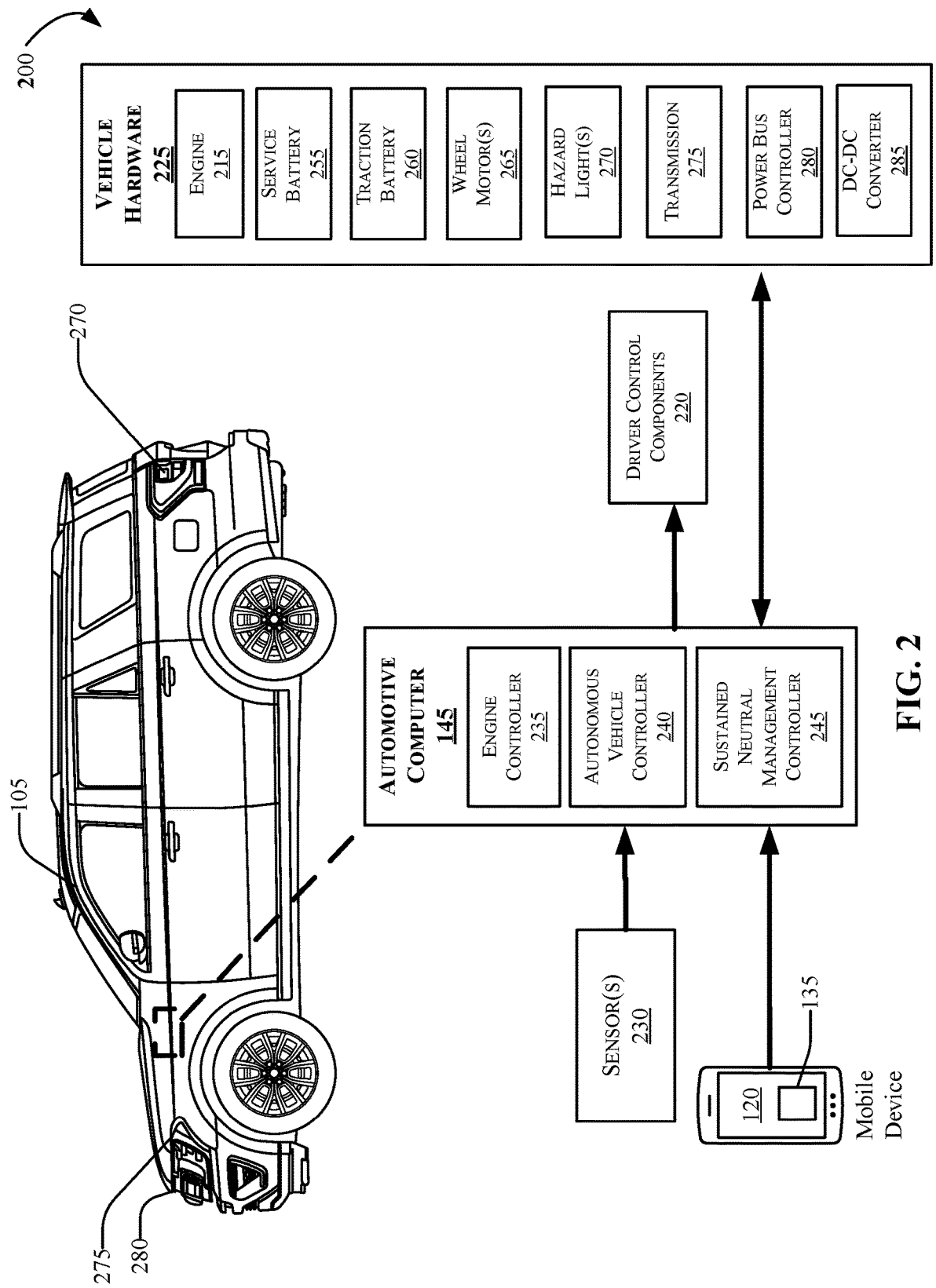
FIG. 2 depicts an exemplary vehicle and computing environment in which techniques and structures for providing the systems and methods disclosed herein may be implemented.

An example AV controller 240 is described in greater detail with respect to FIG. 2. Accordingly, the sustained neutral management system 107 may provide some aspects of human control to the vehicle 105, when the vehicle is configured as an AV.

The mobile device 120 generally includes a memory 123 for storing program instructions associated with an application 135 that, when executed by a mobile device processor 121, performs aspects of the disclosed embodiments. The application (or "app") 135 may be part of the sustained neutral management system 107, or may provide information to the sustained neutral management system 107 and/or receive information from the sustained neutral management system 107.

In some aspects, the mobile device 120 may communicate with the vehicle 105 through the one or more wireless channel(s) 130, which may be encrypted and established between the mobile device 120 and a Telematics Control Unit (TCU) 160. The mobile device 120 may communicate with the TCU 160 using a wireless transmitter (not shown in FIG. 1) associated with the TCU 160 on the vehicle 105. The transmitter may communicate with the mobile device 120 using a wireless communication network such as, for example, the one or more network(s) 125. The wireless channel(s) 130 are depicted in FIG. 1 as communicating via the one or more network(s) 125, and via one or more direct connection(s) via the wireless channel(s) 133. The wireless channel(s) 133 may include various low-energy protocols including, for example, Bluetooth®, BLE, Li-Fi or other optical wireless communication (OWC) technology, acoustic or ultrasonic communications, or other Near Field Communication (NFC) protocols.

The network(s) 125 illustrates an example of an example communication infrastructure in which the connected devices discussed in various embodiments of this disclosure may communicate. The network(s) 125 may be and/or include the Internet, a private network, public network or other configuration that operates using any one or more known communication protocols such as, for example, transmission control protocol/Internet protocol (TCP/IP), Bluetooth®, Wi-Fi based on the Institute of Electrical and Electronics Engineers (IEEE) standard 802.11, Ultra-Wide Band (UWB), and cellular technologies such as Time Division Multiple Access (TDMA), Code Division Multiple Access (CDMA), High Speed Packet Access (HSPDA), Long-Term Evolution (LTE), Global System for Mobile Communications (GSM), and Fifth Generation (5G), to name a few examples.

The automotive computer 145 may be installed in an engine compartment of the vehicle 105 (or elsewhere in the vehicle 105) and operate as a functional part of the sustained neutral management system 107, in accordance with the disclosure. The automotive computer 145 may include one or more processor(s) 150 and a computer-readable memory 155.

The one or more processor(s) 150 may be disposed in communication with one or more memory devices disposed in communication with the respective computing systems (e.g., the memory 155 and/or one or more external databases not shown in FIG. 1). The processor(s) 150 may utilize the memory 155 to store programs in code and/or to store data for performing aspects in accordance with the disclosure. The memory 155 may be a non-transitory computer-readable memory storing a sustained neutral management program code. The memory 155 can include any one or a combination of volatile memory elements (e.g., dynamic random-access memory (DRAM), synchronous dynamic random access memory (SDRAM), etc.) and can include any one or more nonvolatile memory elements (e.g., erasable programmable read-only memory (EPROM), flash memory, electronically erasable programmable read-only memory (EEPROM), programmable read-only memory (PROM), etc.

The VCU 165 may share a vehicle power bus 180, and may be configured to coordinate the data between vehicle 105 systems, connected servers (e.g., the server(s) 170), and other vehicles (not shown in FIG. 1) operating as part of a vehicle fleet. The VCU 165 can include or communicate with any combination of the ECUs 117, such as, for example, a Body Control Module (BCM) 193, an Engine Control Module (ECM) 185, a Transmission Control Module (TCM) 190, the TCU 160, a Restraint Control Module (RCM) 187, etc. In some aspects, the VCU 165 may control aspects of the vehicle 105, and implement one or more instruction sets received from the application 135 operating on the mobile device 120, from one or more instruction sets received from the sustained neutral management system 107, and/or from instructions received from an AV controller, such as an AV controller 240 discussed with respect to FIG. 2.

The TCU 160 can be configured to provide vehicle connectivity to wireless computing systems onboard and offboard the vehicle 105, and may include a Navigation (NAV) receiver 188 for receiving and processing a GPS signal from the GPS satellites 175, a Bluetooth® Low-Energy (BLE) Module (BLEM) 195, a Wi-Fi transceiver, an Ultra-Wide Band (UWB) transceiver, and/or other wireless transceivers (not shown in FIG. 1) that may be configurable for wireless communication between the vehicle 105 and other systems, computers, and modules. The TCU 160 may be disposed in communication with the ECUs 117 by way of a bus 180. In some aspects, the TCU 160 may retrieve data and send data as a node in a CAN bus.

The BLEM 195 may establish wireless communication using Bluetooth® and Bluetooth Low-Energy® communication protocols by broadcasting and/or listening for broadcasts of small advertising packets, and establishing connections with responsive devices that are configured according to embodiments described herein. For example, the BLEM 195 may include Generic Attribute Profile (GATT) device connectivity for client devices that respond to or initiate GATT commands and requests, and connect directly with the mobile device 120.

The bus 180 may be configured as a Controller Area Network (CAN) bus organized with a multi-master serial bus standard for connecting two or more of the ECUs 117 as nodes using a message-based protocol that can be configured and/or programmed to allow the ECUs 117 to communicate with each other. The bus 180 may be or include a high speed CAN (which may have bit speeds up to 1 Mb/s on CAN, 5 Mb/s on CAN Flexible Data Rate (CAN FD)), and can include a low-speed or fault tolerant CAN (up to 125 Kbps), which may, in some configurations, use a linear bus configuration. In some aspects, the ECUs 117 may communicate with a host computer (e.g., the automotive computer 145, the sustained neutral management system 107, and/or the server(s) 170, etc.), and may also communicate with one another without the necessity of a host computer. The bus 180 may connect the ECUs 117 with the automotive computer 145 such that the automotive computer 145 may retrieve information from, send information to, and otherwise interact with the ECUs 117 to perform steps described according to embodiments of the present disclosure. The bus 180 may connect CAN bus nodes (e.g., the ECUs 117) to each other through a two-wire bus, which may be a twisted pair having a nominal characteristic impedance. The bus 180 may also be accomplished using other communication protocol solutions, such as Media Oriented Systems Transport (MOST) or Ethernet. In other aspects, the bus 180 may be a wireless intra-vehicle bus.

The VCU 165 may control various loads directly via the bus 180 communication or implement such control in conjunction with the BCM 193. The ECUs 117 described with respect to the VCU 165 are provided for exemplary purposes only, and are not intended to be limiting or exclusive. Control and/or communication with other control modules not shown in FIG. 1 is possible, and such control is contemplated.

In an example embodiment, the ECUs 117 may control aspects of vehicle operation and communication using inputs from human drivers, inputs from an autonomous vehicle controller, the sustained neutral management system 107, and/or via wireless signal inputs received via the wireless channel(s) 133 from other connected devices such as the mobile device 120, among others. The ECUs 117, when configured as nodes in the bus 180, may each include a central processing unit (CPU), a CAN controller, and/or a transceiver (not shown in FIG. 1). For example, although the mobile device 120 is depicted in FIG. 1 as connecting to the vehicle 105 via the BLEM 195, it is contemplated and that the wireless connection 133 may also or alternatively be established between the mobile device 120 and one or more of the ECUs 117 via the respective transceiver(s) associated with the module(s).

The BCM 193 generally includes integration of sensors, vehicle performance indicators, and variable reactors associated with vehicle systems, and may include processor-based power distribution circuitry that can control functions associated with the vehicle body such as lights, windows, security, door locks and access control, and various comfort controls. The BCM 193 may also operate as a gateway for bus and network interfaces to interact with remote ECUs (not shown in FIG. 1).

The BCM 193 may coordinate any one or more functions from a wide range of vehicle functionality, including energy management systems, alarms, vehicle immobilizers, driver and rider access authorization systems, Phone-as-a-Key (PaaK) systems, driver assistance systems, AV control systems, power windows, doors, actuators, and other functionality, etc. The BCM 193 may be configured for vehicle energy management, exterior lighting control, wiper functionality, power window and door functionality, heating ventilation and air conditioning systems, and driver integration systems. In other aspects, the BCM 193 may control auxiliary equipment functionality, and/or be responsible for integration of such functionality. The BCM 193 may also, in one embodiment, perform computing aspects described, including some or all functionality of the sustained neutral management system 107.

The computing system architecture of the automotive computer 145, VCU 165, and/or the sustained neutral management system 107 may omit certain computing modules. It should be readily understood that the computing environment depicted in FIG. 1 is one example of a possible implementation according to the present disclosure, and thus, it should not be considered limiting or exclusive.

A neutral mode setting may include any combination of settings that may vary based on the type of vehicle being considered, and the powertrain configuration of the vehicle. For example, if the vehicle 105 is configured with a conventional automatic transmission, the neutral mode setting may include placing an automatic transmission (not shown in FIG. 1) of the vehicle 105 in a neutral mode using a console shifter mechanism (not shown in FIG. 1) in the cab of the vehicle 105. In this example, the neutral mode setting may further include any of the following (not shown in FIG. 1): leaving a key in the ignition position, pressing or depressing one or more start/stop buttons associated with the ignition of the vehicle 105, locking or unlocking the vehicle, actuating seat belt mechanisms, opening or closing vehicle doors, actuating/releasing a parking brake, pressing or depressing a brake pedal, and/or performing other acts that place the vehicle 105 in a neutral mode setting that allows towing of the vehicle 105 within operational limits.

Operational limits may include limits as to towing speed when one or more of the vehicle wheels are touching a surface of the road 102. The operational limits may include one or more values indicative of speed limitations associated with automatic transmission speed, and/or values associated with allowable actuation speed for electric motors in the vehicle wheels. The operational limits may further include a maximum voltage value for voltages measured across the vehicle circuitry (not shown in FIG. 1), a current value associated with a measured electric current associated with the vehicle circuitry, a transmission lubrication metric associated with required lubrication of transmission mechanisms (not shown in FIG. 1) for the vehicle 105, a battery charge measurement, a battery depletion rate, a distance traveled while in a neutral state, a time associated with being in a neutral state, a value indicative of total miles towed within a predetermined span of time, and/or the like.

In another aspects, the neutral mode setting(s) described herein may be associated with a method for towing the vehicle 105. For example, the set of neutral mode settings may be associated with two-wheel towing, where either the front wheels closest to the driver position or the rear wheels closest to the rear of the vehicle are in contact with a surface of the road 102 while being towed, and the opposite two wheels are elevated such that they are not in contact with a surface of the road 102, as would be the case when the vehicle 105 is towed with a dolly or trailer, or when the towing vehicle 108 is configured as a commercial wrecker.

In other aspects, the neutral mode setting(s) described herein may include one or more settings associated with two-wheel towing (as depicted in FIG. 1), two wheels of the vehicle 105 are in contact with a surface of the road 102. Four-wheel towing is sometimes used when towing the vehicle 105 behind a recreational vehicle, or in other circumstances.

The mobile device 120 may be disposed in communication with the automotive computer 145 such that the application(s) 135 provide input data to the automotive computer 145. In one example where the mobile device 120 is operational as part of the sustained neutral management system (e.g., the sustained neutral management system 200 as discussed hereafter with respect to FIG. 2), the mobile device 120 may provide input data (e.g., vehicle operational characteristics data) associated with the vehicle 105. The automotive computer 145 may receive the operational characteristics data, which may change with time while the vehicle 105 is in a neutral mode setting (and/or while the vehicle 105 is being towed while in an incorrect operational setting). The automotive computer 145 may use that data to determine one or more vehicle actions to be performed that may provide alerts as to likely imminent danger or harm to the vehicle 105, and/or actions that may provide a remedy. As explained in greater detail hereafter, among those possible actions, the automotive computer 145 may generate an alert signal indicative that the vehicle 105 may likely be imminently damaged due to extant operational parameters that are exceeding allowable operational limits. In other words, where vehicle damage may be caused by continuing the towing operation unless an action is imminently taken.

In one example, the mobile device 120 may be used to determine vehicle speed of the towed vehicle 105, because the mobile device 120 may be traveling at the same speed as the vehicle 105 (although possibly in the interior cabin of the towing vehicle 108). The mobile device 120 may wirelessly send operational characteristics data (e.g., speed, time, location, and/or other data) to the automotive computer 145. The automotive computer 145 may use the operational characteristics data to perform one or more actions for the vehicle 105 based at least in part on the operational characteristics data, and the current neutral mode setting associated with the vehicle 105. The neutral mode setting may be indicated by the TCU 160, or by another vehicle system.

In other aspects, the application(s) 135 on the mobile device 120 may receive one or more alert signals indicative that the vehicle 105 is likely to experience an imminent negative outcome, such as, for example, damage to a battery system, a transmission component, a motor, electric circuitry, and/or other system elements. In other aspects, the application(s) 135 may provide the input data to the automotive computer 145, which may use that data, at least in part, to determine vehicle operation characteristics that may change with time while the vehicle 105 is in a neutral mode setting. For example, the mobile device 120 operating the application(s) 135, may receive a GPS signal from the GPS 175 via a GPS transceiver (not shown in FIG. 1), and determine a vehicle speed of the towed vehicle (the vehicle 105) based at least in part on the GPS signal using a GPS transceiver (not shown in FIG. 1) onboard the mobile device 120. In some aspects, the application(s) 135 may generate an alert signal based at least in part on determining that the vehicle 105 is being towed at a vehicle speed that exceeds a predetermined value for a sustainable towing speed associated with the vehicle.

The mobile device 120 may communicate with the vehicle 105 through the one or more wireless channel(s) 130, established between the mobile device 120 and a Telematics Control Unit (TCU) 160. The mobile device 120 may communicate with the TCU 160 using a wireless transmitter (not shown in FIG. 1) associated with the TCU 160 on the vehicle 105.

The automotive computer 145 may further determine at least one vehicle operation characteristic that changes with time while the vehicle 105 is in a neutral mode setting (and/or while the vehicle 105 is being towed by the towing vehicle 108). The vehicle operational characteristic may include a vehicle speed for the vehicle 105 (the towed vehicle). In this example, the automotive computer 145 may perform one or more vehicle 105 actions based at least in part on the neutral mode setting and the vehicle operational characteristic (the vehicle speed). For example, the vehicle speed while being towed may exceed an operational limit set for the transmission or other components of the vehicle 105.

In another example embodiment, the operational characteristic may include a battery State-Of-Charge (SOC) indicative of a charge state of a vehicle battery (not shown in FIG. 1). In some configurations, the vehicle 105 may include a service battery (not shown in FIG. 1) disposed in communication with electronic components of the drivetrain and/or electronic components in the cabin of the vehicle 105. In other aspects, the vehicle 105 may further include a drive traction battery (not shown in FIG. 1) disposed in communication with one or more traction motors that can actuate the vehicle wheels. Such configurations may be included in HEVs, EVs, and the like. In some aspects, the sustained neutral Management system 107 may determine operational characteristics that include battery SOC for the drive traction battery, the service, battery, or both of the drive traction and service batteries.

In one embodiment, the vehicle 105 is configured with ICE having a mechanical transmission system (not shown in FIG. 1). Transmission systems typically include transmission lubrication and cooling systems that monitor and maintain transmission temperature and keep the transmission components lubricated with transmission oil.

FIG. 2 illustrates the sustained neutral management system 200 that includes the exemplary automotive computer 145, which may be installed in an engine compartment of the vehicle 105 (or elsewhere in the vehicle 105) in accordance with the disclosure. The vehicle 105 may include an engine 215, one or more driver control component(s) 220, vehicle hardware 225, and one or more sensor(s) 230. In some cases, the engine 215 is customizable to allow operation of the vehicle 105, and may be controlled using an engine controller 235. For example, the automotive computer 145 may cause the engine controller 235 to generate and execute a motor start command that causes the engine 215 to start. In other aspects, the engine controller may be disposed in communication with a power bus controller 280 instead of or in addition to the engine 215. Accordingly, the engine controller 235 may perform vehicle actions that can include engaging an automated start powertrain activation while the vehicle 105 is in the neutral mode setting or situated on an incline. Engaging the automated start powertrain activation may include engaging the engine 215 to an on state and powering a vehicle alternator (not shown in FIG. 1). In other aspects, when the vehicle 105 is configured as an EV, engaging the automated start powertrain activation can include feeding a service battery 255 from a traction battery 260 through a DC-DC converter 285.

If not flat towed due to the incline of the towed vehicle, one or more controllers, which may include the engine controller 235, may output an alert indicative of a fuel fill prior to towing. In other aspects, the engine controller 185 or other vehicle controller of the VCU 165 may output an alert suggesting more frequent fueling during towing, which may ensure proper levels for the fuel sender. In an embodiment where the environmental characteristic includes indication that the vehicle is approaching a tunnel, or in a neutral operational mode and running while traveling through a tunnel, the vehicle controller(s) may suspend the Remote Start if the towing and running vehicle are in a tunnel for an extended period. In other aspects, the vehicle controller(s) may suspend Remote Start when the GPS or vehicle cameras indicate that the vehicle is positioned at or near railroad tracks. To make such determinations, the controller in the towed vehicle may match the vehicle operational state states of the towing vehicle. For example, we start the towed vehicle only when the towing vehicle is in motion.

As another example, the neutral management controller 245 may suspend running the towed vehicle when the towing vehicle is stationary, and activate the fuel saving STOP-START engine shutdown. In an example embodiment, the neutral management controller 245 may match the STOP-START mode of the towing vehicle.

The automotive computer 145 may further include an autonomous vehicle controller 240, and a sustained neutral management controller 245. One or more mobile device(s) (e.g., the mobile device 120) may be configured to communicate data to and from the automotive computer 145 using one or more wireless and/or wired communications protocols described herein. Such data transfer has been described in some detail above with respect to FIG. 1.

The sustained neutral management controller 245 (hereafter "the neutral management controller 245" may be configured to determine a vehicle configuration indicative of a neutral mode setting for the vehicle 105, and receive information that may indicate whether the vehicle 105 is currently in a Neutral mode and whether the vehicle 105 may be in danger of imminent damage resulting from an operation (e.g., towing or prolonged parking while in neutral). Accordingly, the neutral management controller 245 may receive information from the one or more sensor(s) 230, which may be associated with and/or controlled by the VCU 165 (depicted in FIG. 1), where the information can include a signal indicative of a neutral transmission gear setting, a vehicle speed, or another similar signal. The transmission gear setting can further indicate whether the vehicle 105 is in a neutral mode setting. The other signals received by the neutral management controller 245 may indicate whether the vehicle 105 is being towed, being moved while in a neutral drivetrain mode, parked for a prolonged period of time in a neutral mode, and whether vehicle damage may be imminent based on one or more values that change with time.

For example, the neutral management controller 245 may receive information from the vehicle hardware 225 indicative of a charge status associated with one or more service batteries 255, one or more traction batteries 260, and/or other batteries associated with operation of the vehicle 105. Accordingly, the automotive computer 145 may query one or more of the ECMs 185, TCM 190, the BCM 193, or another module of the VCU 165 associated with the vehicle hardware 225, receive a signal indicative of a charge status of one or more of the service battery 255 and the traction battery 260, and determine, based at least in part on the signal, whether vehicle damage may be imminent by comparing the signal to predetermined data associated with safe operational parameters for the vehicle. Querying may take place at periodic intervals, and determine, based on mathematical operations on the series of periodic values, whether one or more of the values provide a usable data source for determining the operational parameters. For example, the mathematical operations may include a running average, a statistical analysis, and/or another mathematical operation.

The predetermined data may be stored in, for example, the memory 155 depicted with respect to FIG. 1. In one example embodiment, the neutral management controller 245 may perform, based at least in part on the neutral mode setting and the vehicle operation characteristic values, one or more vehicle actions that include engaging a automated start powertrain activation while the vehicle is in the neutral mode setting or situated on an incline. For example, the neutral management controller 245 may generate a automated start command, and engage the automated start powertrain activation based on the automated start command. The automated start powertrain activation may start the engine 215, which (in the case of an ICE vehicle) may power a vehicle alternator (not shown in FIG. 2), which charges one or more vehicle batteries 255, 260, and engages the transmission cooling capabilities associated with the transmission 275, including circulating transmission oil to internal transmission components. Any or all of these activities can be configured to run for a set length of time or until a shutdown command is received.

In another example where the vehicle 105 is configured as an EV, HEV, etc., engaging the automated start powertrain activation can include vehicle actions comprising engaging a battery connection in a key-off neutral state. The engine controller 235 may cause the power bus controller 280 to feed the service battery 255 from the traction battery 260 through a DC-DC converter 285. More particularly, the neutral management controller 245 may generate a traction motor connection command (not shown in FIG. 2), and connect the vehicle power bus 180 (as discussed in FIG. 1) via the power bus controller 280 to a high voltage battery (e.g., the service battery 255) based on the traction motor connection command.

In other aspects, the neutral management controller 245 may receive information associated with the wheel motor(s) 265, such as, for example, an output voltage associated with actuation of the wheel motor(s) 265. The neutral management controller 245 may determine, based at least in part on the vehicle speed, a charge status of one or more of the service battery 255 and the traction battery 260. The neutral management controller 245 may start the motor (e.g., the engine 215) based at least in part on the vehicle 105 speed and the charge status of the service battery 255 and/or the traction battery 260.

In other aspects, the neutral management controller 245 may query one or more voltage detection devices (sensor(s) 230), and/or one or more current detection devices (sensor(s) 230) associated with the vehicle 105 circuitry. In the present example, the neutral management controller 245 may charge, via the engine 215, one or more of the service battery 255 and the traction battery 260 to a predetermined charge value, and turn off the engine 215 (and/or disconnect the DC-DC converter 285) responsive to determining that a charge of one or more of the service battery 255 and the traction battery 260 has reached the predetermined charge value. The predetermined charge value may be stored as a predetermined value in the memory 155.

In another example, the neutral management controller 245 may evaluate a transmission output speed for the vehicle 105, where the transmission output speed may be caused by one or more vehicle 105 wheels rolling on the surface of the road 102 (as shown in FIG. 1). This inquiry may determine, at least in part, whether the transmission of the vehicle 105 is functioning at or above allowable operational limits in the neutral mode operation without damaging the transmission. This inquiry may also consider whether the transmission of the vehicle 105 is lubricated, by providing one or values indicative of a relative lubrication setting including, for example, a lubricant pressure, temperature, level, etc. Allowable operational limits with respect to the transmission may include lubricant level, lubricant quality, transmission oil and/or transmission temperature, transmission speed, and/or other values.

In one aspect, determining the vehicle speed can include determining an independent wheel speed for vehicle wheels independently. For example, when the vehicle is being towed as shown in FIG. 1, the front wheels of the vehicle 105 may not spin, whereas the rear wheels in contact with the surface of the road 102 do spin. In other aspects, the vehicle may be towed in reverse, making the front wheels spin where the rear wheels are stationary.

Figure 3:
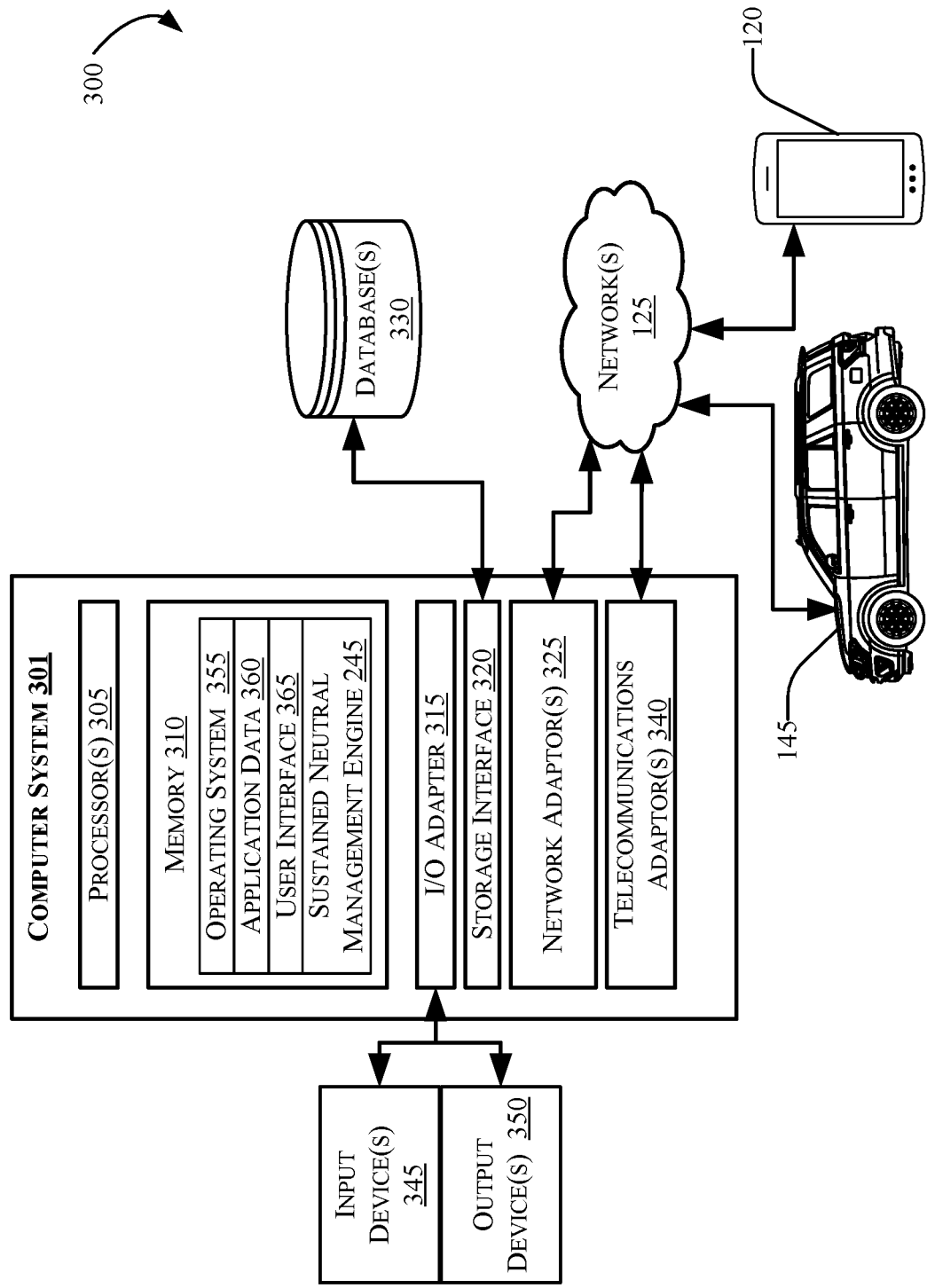
FIG. 3 depicts a computing environment in which techniques and structures for providing the systems and methods disclosed herein may be implemented.

FIG. 3 illustrates a block diagram of a computing environment 300, which may include a computer system 301 for use in practicing the embodiments described herein. The environment and system described herein can be implemented in hardware, software (e.g., firmware), or a combination thereof. The computer system 301 may be representative of one or more of the computing systems depicted with respect to FIGS. 1 and 2. For example, the one or more cloud-based server(s) 170 may be substantially similar or identical to the computer system 301.

The computer system 301 may include one or more processor(s) 305, a memory 310 communicatively coupled to the one or more processor(s) 305, and one or more input/output adaptors 315 that can communicatively connect with external devices such as, for example, input devices 345 and/or output devices 350. The computer system 301 may operatively connect to and communicate information with one or more internal and/or external memory devices such as, for example, one or more databases 330 via a storage interface 320. The computer system 301 may also include one or more network adaptor(s) 325 enabled to communicatively connect the computer system 301 with one or more network(s) 125.

In one embodiment, the computer system 301 can include one or more telecommunications network(s) for communication between the computer system 301 and any external device, such as, for example, the mobile device 120 (as shown in FIG. 1). The computer system 301 can further include one or more telecommunications adaptor(s) 340. Example network adaptor(s) 325 and telecommunications adaptor(s) 340 may include those adaptors associated with the TCU 160, as discussed in FIG. 1.

The one or more processor(s) 305 are collectively a hardware device for executing program instructions (aka software), stored in a computer-readable memory (e.g., the memory 310). The one or more processor(s) 305 can be a custom made or commercially-available processor, a central processing unit (CPU), a plurality of CPUs, an auxiliary processor among several other processors associated with the computer system 301, a semiconductor-based microprocessor (in the form of a microchip or chip set), or generally any device for executing instructions.

The one or more processor(s) 305 may be disposed in communication with one or more memory devices (e.g., the memory 310 and/or one or more external databases 330, etc.) via a storage interface 320. The storage interface 320 can also connect to one or more memory devices including, without limitation, one or more databases 330, and/or one or more other memory drives (not shown in FIG. 3) including, for example, a removable disc drive, a vehicle computing system memory, cloud storage, etc., employing connection protocols such as serial advanced technology attachment (SATA), integrated drive electronics (IDE), universal serial bus (USB), fiber channel, small computer systems interface (SCSI), etc.

The memory 310 can include one or a combination of volatile memory elements (e.g., dynamic random-access memory (DRAM), synchronous dynamic random-access memory (SDRAM), etc.) and can include one or more nonvolatile memory elements (e.g., erasable programmable read-only memory (EPROM), flash memory, electronically erasable programmable read-only memory (EEPROM), programmable read-only memory (PROM), etc.).

The instructions in the memory 310 can include one or more separate programs, each of which can include an ordered listing of computer-executable instructions for implementing logical functions. In the example of FIG. 3, the instructions in the memory 310 can include an operating system 355. The operating system 355 can control the execution of other computer programs such as, for example the sustained neutral management controller 245, and provides scheduling, input-output control, file and data management, memory management, and communication control and related services.

The program instructions stored in the memory 310 can further include application data 360, and instructions for controlling and/or interacting with the computer through a user interface 365.

The I/O adaptor 315 can connect a plurality of input devices 345 to the computing system 301. The input devices can include, for example, a keypad or keyboard, a microphone, a sensor, one or more virtual keyboard(s) on a touchscreen interface, or another conventional input device.

The I/O adaptor 315 can also connect a plurality of output device(s) 350, which can include, for example, a display, a speaker, a touchscreen, etc. The output device(s) 350 may include one or more display adaptor(s) coupled to one or more display(s) (not shown in FIG. 3). The output devices 50 can include but are not limited to a printer, a scanner, and/or the like. Other output devices can also be included, although not shown.

Finally, the I/O devices 345 and 350 that may be connectable to the I/O adaptor 315 can further include devices that communicate both inputs and outputs, for instance but are not limited to, a network interface card (NIC) or modulator/demodulator (for accessing other files, devices, systems, or a network), a radio frequency (RF) or other transceiver, a Near Field Communication (NFC) device, a Bluetooth® Low energy receiver, UWB device, an ad-hoc networking device, a bridge, a router, etc.).

According to some example embodiments, the computer system 301 can include one or more telecommunications adaptor(s) 340 that may be disposed in communication with a mobile telecommunications infrastructure such as, for example, mobile phone towers, satellites, vehicle-to-vehicle network infrastructure, etc. The telecommunications adaptor(s) 340 can also include and/or be disposed in communication with or more other adaptors configured to transmit and/or receive cellular, mobile, and/or other communications protocols for wireless communication.

The computer system 301 may transmit and receive data between the network(s) 125 and devices and/or systems external to the computer system 301. For example, the network(s) 125 may operatively connect the automotive computer 145 with the computer system 301.

The networks(s) 125 may also be disposed in communication with the mobile device 120.

In one embodiment the computer system 301 may be configured to utilize information obtained from sensors 230 in order to determine whether the car is being currently driven or towed. Such information can, for example, be the speed of the vehicle, the GPS location data, the nature and presence of the steering, camera images, the presence of weight in the driver's seat, etc. The computer system 301 may be further configured to transmit an instruction to neutral management controller 245 to generate an automated start command or shutdown command in accordance with the data.

Figure 4:
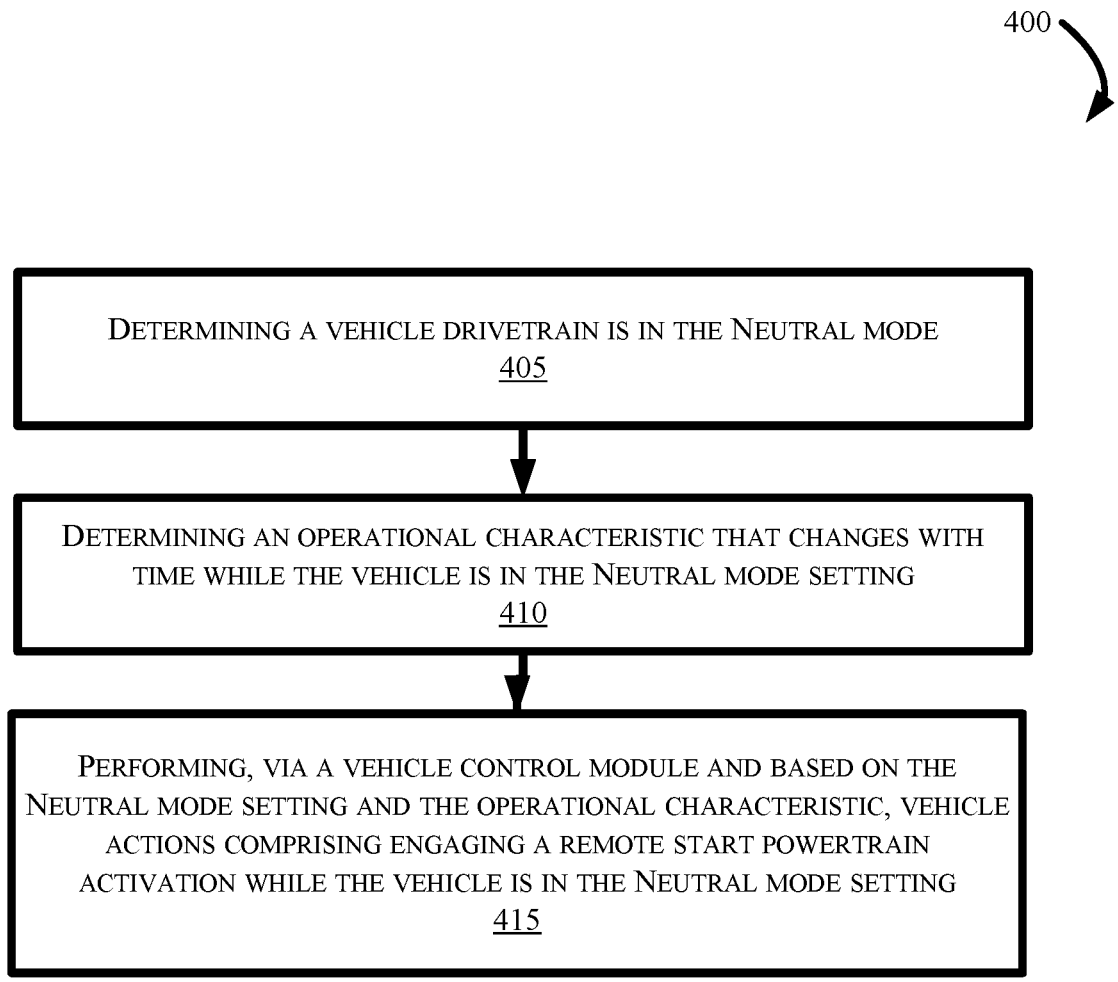
FIG. 4 is a flowchart of an example method in accordance with the present disclosure.
Figure 5:
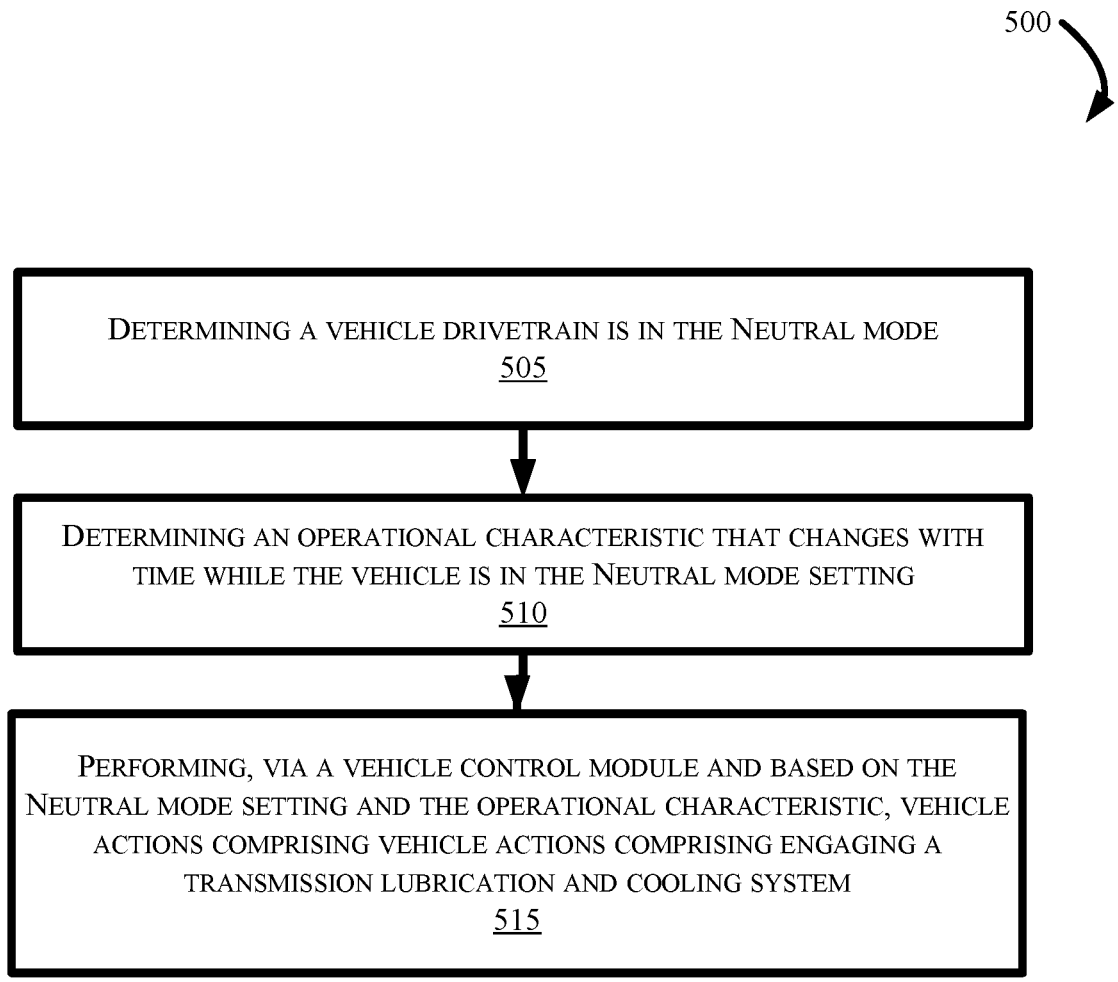
FIG. 5 is a flowchart of an example method in accordance with the present disclosure.
Figure 6:
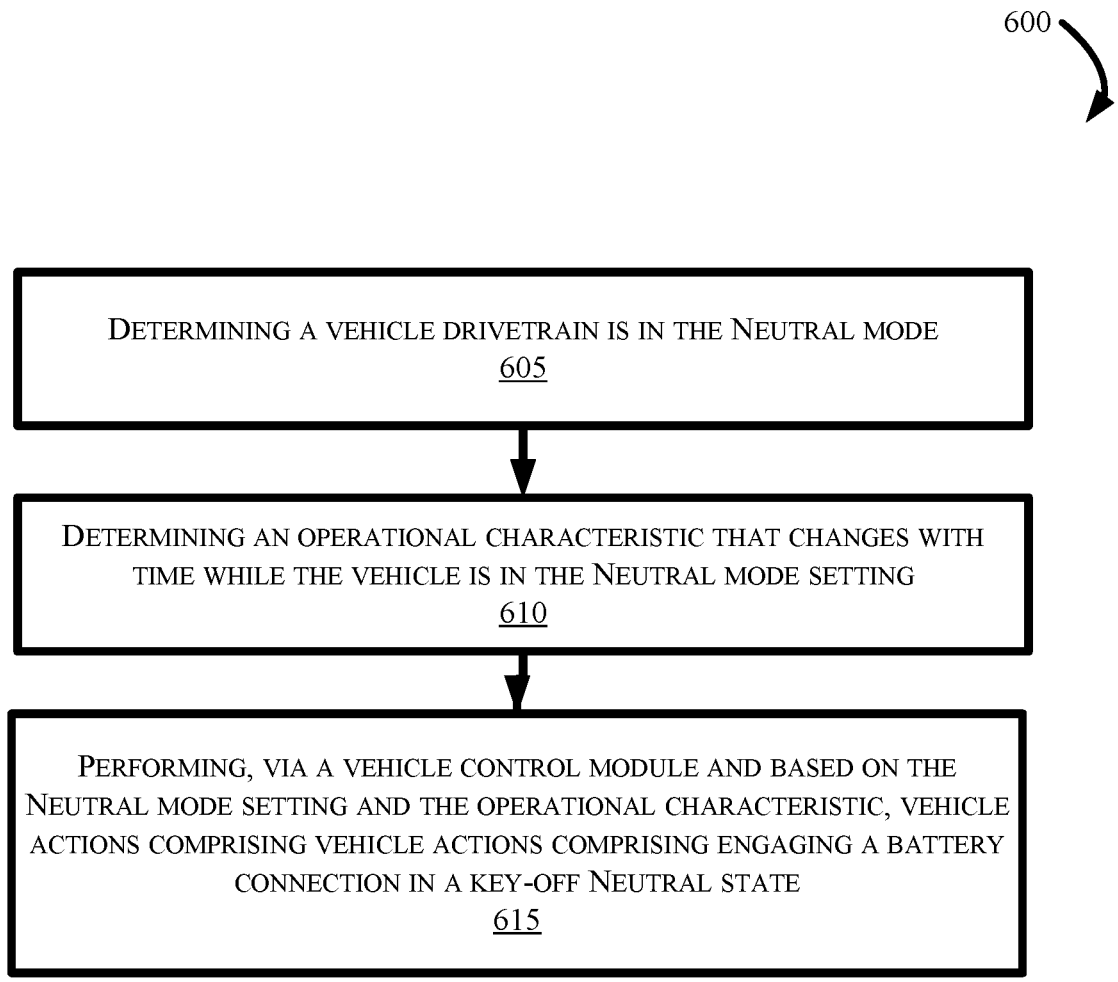
FIG. 6 is a flowchart of an example method in accordance with the present disclosure.

FIG. 4 is a flow diagram of an example method 400 for managing Key Off Load (KOL) in a vehicle while in a neutral mode, according to the present disclosure. FIG. 5 is a flow diagram of an example method 500 for maintaining transmission lubrication and temperature in a vehicle while in a neutral mode, according to another embodiment of the present disclosure. FIG. 6 is a flow diagram of an example method 600 for maintaining a neutral mode in an electric vehicle drivetrain of a vehicle, according to another embodiment of the present disclosure. FIGS. 4-6 may be described with continued reference to prior figures, including FIGS. 1-3. The following processes are exemplary and not confined to the steps described hereafter. Moreover, alternative embodiments may include more or less steps that are shown or described herein, and may include these steps in a different order than the order described in the following example embodiments.

Referring first to FIG. 4, at step 405, the method 400 may commence with determining a vehicle drivetrain is in the neutral mode. In one example embodiment, this step includes generating, from a vehicle control module, a traction motor connection command, and connecting a vehicle power bus to a high voltage battery based on the traction motor connection command.

At step 410, the method 400 may further include determining an operational characteristic that changes with time while the vehicle is in the neutral mode setting. This step may include determining a battery State-Of-Charge (SOC), which may indicate a charge level of the vehicle battery, a rate of charging or discharging, and other parameters that may include battery health, impedance, or other characteristics. Moreover, in some aspects, this step may include determining the battery SOC for a service battery, determining the battery SOC for a drive traction battery, or determining the battery SOC for a drive traction battery and a service battery.

At step 415, the method 400 can include performing, via a vehicle control module and based on the neutral mode setting and the operational characteristic, vehicle actions comprising engaging an automated start powertrain activation while the vehicle is in the neutral mode setting. In one example embodiment, this step includes generating, from a vehicle control module, a traction motor connection command, and engaging the automated start powertrain activation based on the automated start command.

In another embodiment, when the vehicle is configured with an internal combustion engine, this step may include engaging the engine to an on state and powering a vehicle alternator.

In another embodiment, when the vehicle is configured as an EV or HEV, this step may include feeding a service battery from a traction battery through a DC-DC converter.

With reference to FIG. 5, at step 505, the method 500 may commence with determining a vehicle drivetrain is in the neutral mode.

At step 510, the method 500 may further include determining an operational characteristic that changes with time while the vehicle is in the neutral mode setting.

At step 515, the method 500 can include performing, via a vehicle control module and based on the neutral mode setting and the operational characteristic, vehicle actions comprising engaging a transmission lubrication and cooling system. In one example embodiment, this step includes generating, from a vehicle control module, a traction motor connection command, and connecting a vehicle power bus to a high voltage battery based on the traction motor connection command.

With reference to FIG. 6, at step 605, the method 600 may commence with determining a vehicle drivetrain is in the neutral mode.

At step 610, the method 600 may further include determining an operational characteristic that changes with time while the vehicle is in the neutral mode.

At step 615, the method 600 can include performing, via a vehicle control module and based on the neutral mode setting and the operational characteristic, vehicle actions comprising engaging a battery connection in a key-off neutral state. In one example embodiment, this step includes generating, from a vehicle control module, a traction motor connection command, and connecting a vehicle power bus to a high voltage battery based on the traction motor connection command.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "exemplary" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method for managing Key Off Load (KOL) in a vehicle while in a neutral mode setting, comprising:
   determining a vehicle drivetrain is in the neutral mode setting;
   determining an operational characteristic that changes with time while the vehicle is in the neutral mode setting;
   performing, via a vehicle control module and based on the neutral mode setting and the operational characteristic, vehicle actions comprising engaging an automated start powertrain activation while the vehicle is in the neutral mode setting.

2. The method according to claim 1, wherein engaging the automated powertrain start activation comprises:
   generating, from the vehicle control module, an automated start command; and
   engaging the automated start powertrain activation based on the automated start command.

3. The method according to claim 1, wherein the vehicle comprises an internal combustion engine drivetrain, and engaging the automated start powertrain activation comprises:
   engaging an engine to an on state and mechanically powering a vehicle electrical generator.

4. The method according to claim 1, wherein the vehicle comprises an electric vehicle, and engaging the automated start powertrain activation comprises:

feeding a service battery from a traction battery through a DC-DC converter.

5. The method according to claim 1, wherein determining the operational characteristic comprises determining a battery State-Of-Charge (SOC).

6. The method according to claim 5, wherein determining the operational characteristic comprises determining a rate of change of the battery SOC.

7. The method according to claim 5, wherein determining the operational characteristic comprises determining the battery SOC for a service battery.

8. The method according to claim 5, wherein determining the operational characteristic comprises determining the battery SOC for a drive traction battery.

9. The method according to claim 5, wherein determining the operational characteristic comprises determining the battery SOC for a drive traction battery and a service battery.

10. A method for maintaining transmission lubrication and temperature in a vehicle while in a neutral mode setting, comprising:
   determining a vehicle drivetrain is in the neutral mode setting;
   determining an operational characteristic that changes with time while the vehicle is in the neutral mode setting; and
   performing, via a vehicle control module and based on the neutral mode setting and the operational characteristic, vehicle actions comprising engaging a transmission lubrication and cooling system.

11. The method according to claim 10, wherein determining the operational characteristic comprises determining a vehicle speed.

12. The method according to claim 11, wherein performing the vehicle actions comprises:
   determining, based on the vehicle speed, that the vehicle is being towed at a speed that exceeds a predetermined value for sustainable towing speed; and
   engaging the transmission lubrication and cooling system.

13. The method according to claim 12, wherein determining the vehicle speed comprises determining an independent wheel speed for a plurality of vehicle wheels.

14. The method according to claim 10, wherein determining the operational characteristic comprises determining Transmission Oil Temperature (TOT) in a transmission in the vehicle.

15. The method according to claim 10, wherein determining the operational characteristic comprises determining a rate of change of Transmission Oil Temperature (TOT).

16. The method according to claim 10, wherein engaging the transmission lubrication and cooling system comprises:
   generating, from the vehicle control module, an automated start command; and
   engaging an automated start powertrain activation based on the automated start command.

17. The method according to claim 16, wherein the vehicle comprises an internal combustion engine drivetrain, and engaging the automated start powertrain activation comprises:
   engaging an engine to an on state and mechanically powering a vehicle transmission.

18. The method according to claim 16, wherein the vehicle comprises an electric vehicle, and engaging the automated start powertrain activation comprises:
   feeding a service battery from a traction battery through a DC-DC converter.

19. A method for maintaining a neutral mode in an electric vehicle drivetrain of a vehicle comprising:
   determining the electric vehicle drivetrain is in the neutral mode;
   determining an operational characteristic that changes with time while the vehicle is in the neutral mode; and
   performing, via a vehicle control module and based on the neutral mode and the operational characteristic, vehicle actions comprising engaging a battery connection to a traction motor in a key-off neutral state.

20. The method according to claim 19, wherein engaging the battery connection in the key-off neutral state comprises:
   generating, from the vehicle control module, a traction motor connection command; and
   connecting the vehicle traction motor to a high voltage battery via a power bus based on the traction motor connection command.

* * * * *